(12) United States Patent
West

(10) Patent No.: US 7,664,691 B2
(45) Date of Patent: Feb. 16, 2010

(54) METHOD AND APPARATUS FOR FACILITATING FINANCIAL MONITORING BY GUARDIANS

(75) Inventor: Lawrence L. West, Bonita, CA (US)

(73) Assignee: Intuit Inc., Mountain View, CA (US)

( * ) Notice: Subject to any disclaimer, the term of this patent is extended or adjusted under 35 U.S.C. 154(b) by 269 days.

(21) Appl. No.: 11/413,731

(22) Filed: Apr. 28, 2006

(65) Prior Publication Data

US 2007/0192248 A1 Aug. 16, 2007

Related U.S. Application Data

(63) Continuation-in-part of application No. 11/346,090, filed on Feb. 1, 2006.

(51) Int. Cl.
*G06Q 40/00* (2006.01)
(52) U.S. Cl. .......................................... 705/35; 705/36
(58) Field of Classification Search ............. 705/35–36
See application file for complete search history.

(56) References Cited

U.S. PATENT DOCUMENTS

2005/0149436 A1* 7/2005 Elterich ...................... 705/39

OTHER PUBLICATIONS

U.S. Appl. No. 60/882,781, filed Dec. 2005, Adler et al.*

* cited by examiner

*Primary Examiner*—Thu Thao Havan
(74) *Attorney, Agent, or Firm*—Park, Vaughan & Fleming LLP

(57) ABSTRACT

One embodiment of the present invention provides a system that enables a guardian to monitor a financial account on behalf of an account owner, such as a senior citizen. During operation, the system receives a request from the guardian to access the financial account. In response to this request, the system determines whether the guardian is authorized to access the financial account. If so, the system provides the guardian with read-only access to the financial account, whereby the guardian can monitor activity in the financial account, but cannot perform operations that modify the financial account.

28 Claims, 3 Drawing Sheets

METHOD AND APPARATUS FOR FACILITATING FINANCIAL MONITORING BY GUARDIANS

RELATED APPLICATION

This application is a continuation-in-part of, and hereby claims priority under 35 U.S.C. § 120 to, U.S. patent application Ser. No. 11/346,090, entitled "Method and Apparatus for Implementing an Activity Watch for Financial Accounts," by inventor Lawrence L. West, filed on 1 Feb. 2006.

BACKGROUND

Related Art

The present invention relates to computer-based system for maintaining financial information.

Increasing life expectancies in recent years have led to a significant increase in the senior population. Most senior citizens are competent to run their own affairs. However, as they continue to age, senior citizens typically experience a gradual decline in mental acuity, which can interfere with their ability to make decisions. Although many senior citizens are aware of this decline, they are often reluctant to surrender control of their affairs, and to have their children (or others) appointed as guardians. In spite of this reluctance, it may be beneficial to allow their children (or guardians) to monitor their financial affairs.

SUMMARY

One embodiment of the present invention provides a system that enables a guardian to monitor a financial account on behalf of an account owner, such as a senior citizen. During operation, the system receives a request from the guardian to access the financial account. In response to this request, the system determines whether the guardian is authorized to access the financial account. If so, the system provides the guardian with read-only access to the financial account, whereby the guardian can monitor activity in the financial account, but cannot perform operations that modify the financial account.

In a variation on this embodiment, the system receives a request from the guardian to restrict an activity on the financial account. In response to this request, the system determines if the guardian is authorized to restrict the activity. If so, the system restricts the activity.

In a further variation, restricting the activity can involve putting a freeze on transactions for the financial account.

In a variation on this embodiment, the request to access the financial account is received at a third-party server, which is independent from a financial institution that maintains the financial account. This the third-party server determines whether the guardian is authorized to access the financial account, and if so, facilitates read-only access to the financial account.

In a variation on this embodiment, the system automatically receives transactions associated with the financial account and applies one or more rules to these transactions to determine whether the guardian should be alerted. If a rule indicates that the guardian should be alerted, the system sends an alert to the guardian.

In a further variation, sending the alert to the guardian can involve: sending an email to the guardian; sending a pager notification to the guardian; sending a recorded telephone message to the guardian; sending a facsimile to the guardian; or causing a human operator to contact the guardian.

In a further variation, sending the alert to the guardian involves sending an escalating series of alerts to the guardian if the guardian does not respond to any of the alerts.

In a further variation, after sending the alert, the system allows the guardian to obtain details about the one or more transactions that triggered the alert.

In a further variation, the system allows the guardian to specify and/or modify the one or more rules that determine whether an alert should be triggered.

In a further variation, receiving the transactions involves receiving transactions for multiple financial accounts belonging to the account owner, wherein the multiple financial accounts are associated with multiple financial institutions.

In a further variation, receiving the transactions involves: obtaining account-access information from the account owner; and using the account-access information to obtain the transactions associated with the financial account from the financial institution.

In a variation on this embodiment, the financial account can include, but is not limited to: a bank account; a credit-card account; a credit report, or an investment account.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Third-Party Server

Figure 1:
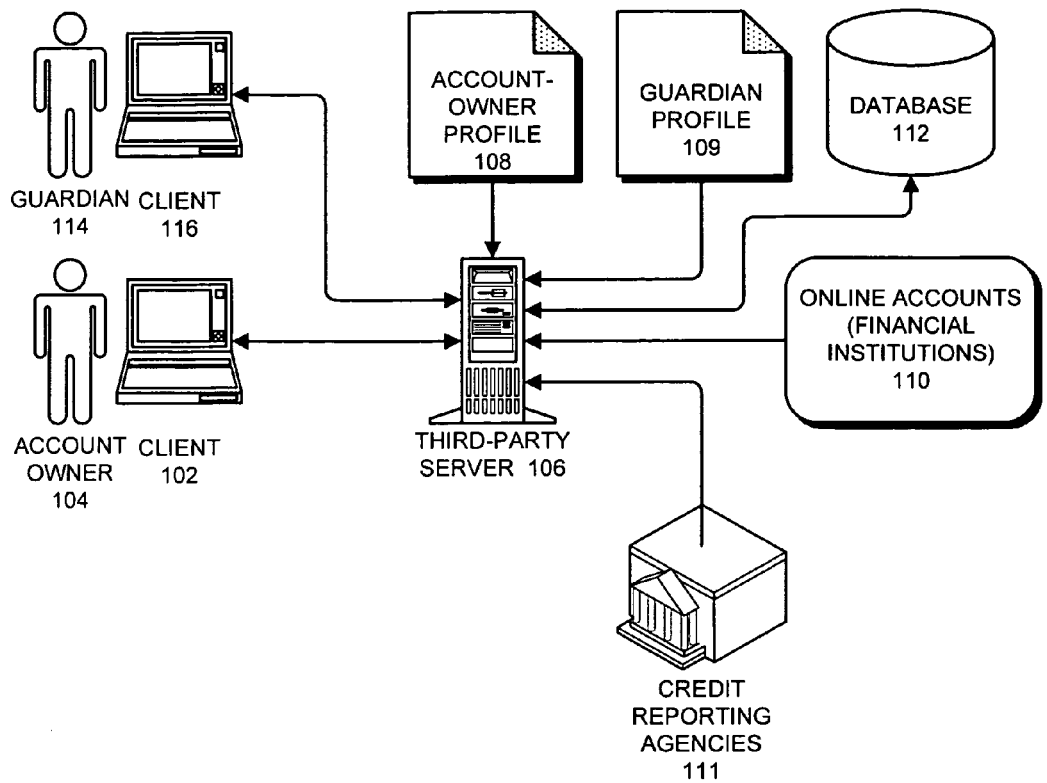
FIG. 1 illustrates a third-party server which facilitates financial monitoring by guardians in accordance with an embodiment of the present invention.

FIG. 1 illustrates a third-party server 106 in accordance with an embodiment of the present invention. Third-party server 106 can generally include any computational node (or a collection of distributed nodes providing services as one entity) including a mechanism for servicing requests from a client for computational and/or data storage resources. Third-party server 106 is associated with a local database 112, which stores information associated with accounts and various account owners.

In FIG. 1, an account owner 104 interacts with third-party server 106 through client system 102, and a guardian 114 interacts with third-party server 106 through client system 116. Client systems 102 and 116 can generally include any node on a network including computational capability and including a mechanism for communicating across the network.

Guardian 114 can include any person who can monitor an account on behalf of an account owner 104. For example, account owner 104 can be a senior citizen, and guardian 114 can be an adult child (or caretaker) of the senior citizen.

Third-party server 106 constructs an "account-owner profile" 108 based upon information obtained from account owner 104, and can similarly construct a "guardian profile" 109 based on information obtained from guardian 114. Both account-owner profile 108 and guardian profile 109 are discussed in more detail below.

Third-party server 106 also receives information about online accounts 110 from remote computer systems belonging to one or more financial institutions. Third-party server 106 can also receive information from credit reporting agencies 111.

Figure 2:
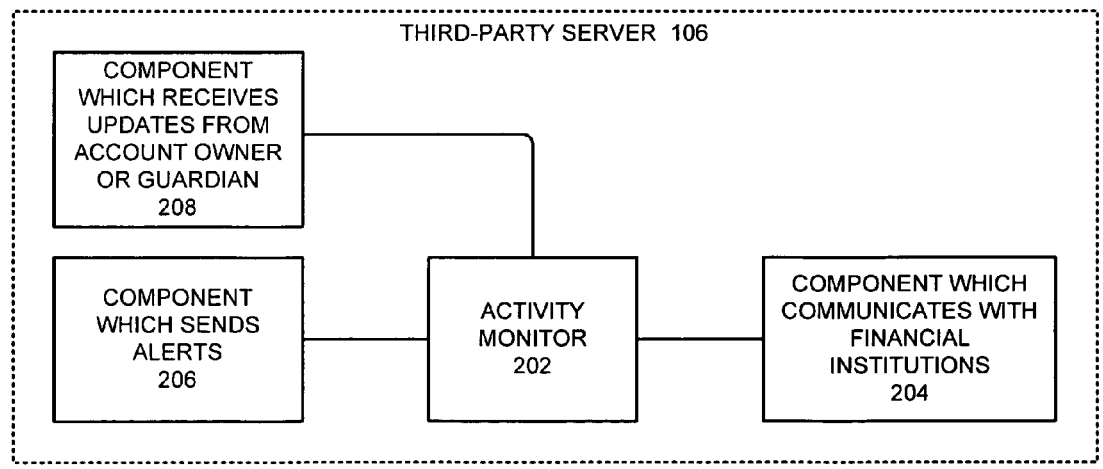
FIG. 2 illustrates the internal structure of the third-party server in accordance with an embodiment of the present invention.

FIG. 2 illustrates the internal structure of third-party server 106 in accordance with an embodiment of the present invention. Third-party server 106 includes an activity monitor 202, which monitors account activity, either through polling or some other mechanism. Third-party server also includes a number of components, including: a component 208 which receives updates from account owners or guardians; a component 206 which sends alerts to the account owners; and a component 204 which communicates with financial institutions to obtain account information. The operations performed by these components are described in more detail below.

Configuring the Third-Party Server

Figure 3A:
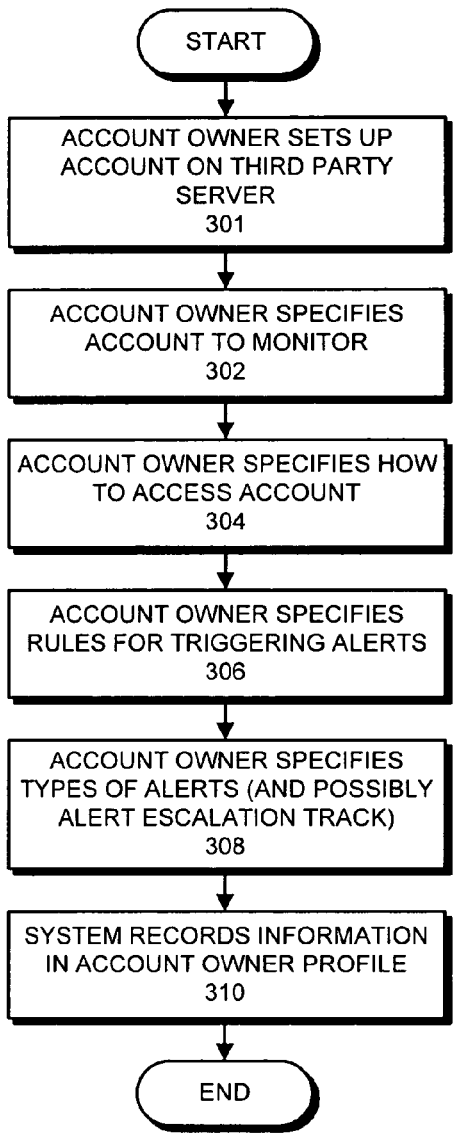
FIG. 3A presents a flow chart illustrating the process of configuring the third-party server for an account owner in accordance with an embodiment of the present invention.

FIG. 3A presents a flow chart illustrating the process of configuring third-party server 106 for an account owner in accordance with an embodiment of the present invention. First, account owner 104 sets up an account and an associated account-owner profile 108. Next, account owner 104 specifies which accounts to monitor (step 302), and how to access the accounts (step 304). (This can involve supplying account numbers and passwords or other account-related information.) Account owner 104 can also specify rules for triggering alerts (step 306), as well as the types of alerts to generate (step 308). The system records this information in account owner profile 108 (step 310).

Figure 3B:
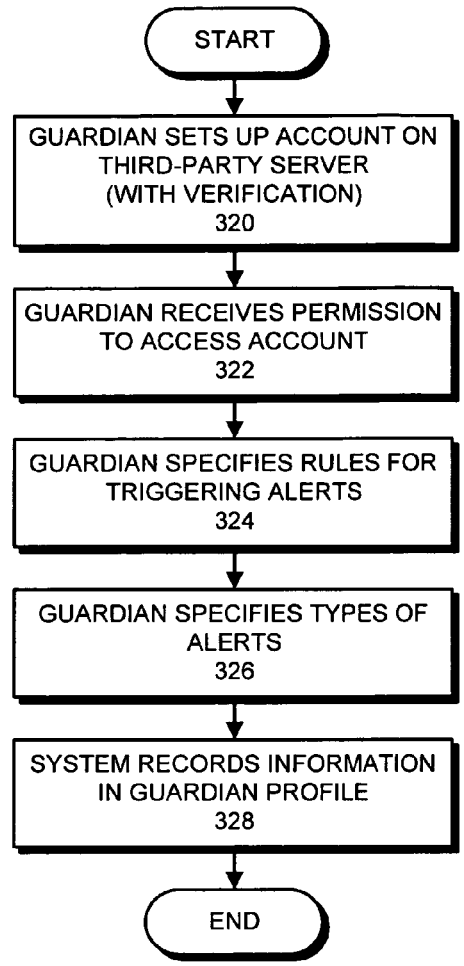
FIG. 3B presents a flow chart illustrating the process of configuring the third-party server for a guardian in accordance with an embodiment of the present invention.

FIG. 3B presents a flow chart illustrating the process of configuring third-party server 106 for a guardian in accordance with an embodiment of the present invention. First, guardian 114 sets up an account and an associated guardian profile 109 (step 320). Next, guardian 114 receives permission to access one or more accounts belonging to account owner 104 (step 322). This can involve receiving permission directly from account owner 104, or alternatively, receiving permission through legal means, such as a court order. Guardian 114 can also specify rules for triggering alerts (step 324), as well as the types of alerts to generate (step 326). The system records this information in guardian profile 109 (step 328).

Allowing a Guardian to Access and Account

Figure 4:
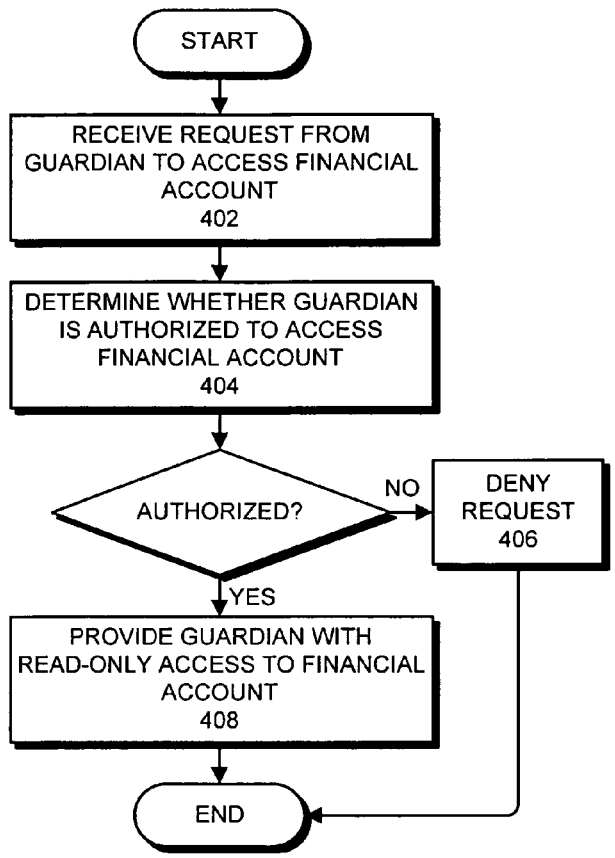
FIG. 4 presents a flow chart illustrating how the third-party server allows a guardian to access an account in accordance with an embodiment of the present invention.

FIG. 4 presents a flow chart illustrating how the third-party server allows a guardian to access an account in accordance with an embodiment of the present invention. During operation, the third-party server receives a request from the guardian to access a financial account belonging to an account owner (step 402). Next, the system determines whether the guardian is authorized the access the financial account (step 404). This can involve accessing account-specific authorization information stored locally at the third-party server. For example, referring to FIG. 1, this authorization information can be stored in guardian profile 109, or alternatively in account-owner profile 108, or in some other data stored in database 112. If the guardian is not authorized to access the financial account, the system denies the request (step 406). The system can also take other actions, such as notifying a system administrator.

On the other hand, if the guardian is authorized to access the financial account, the third-party server can provide the guardian with read-only access to the financial account (step 408). This read-only access allows the guardian to monitor activity in the financial account, but does not allow the guardian to perform operations that modify the financial account. In one embodiment of the present invention, the system additionally give the guardian the ability to restrict activity on the financial account. For example, the guardian can put a freeze on transactions for the financial account.

Monitoring an Account

Figure 5:
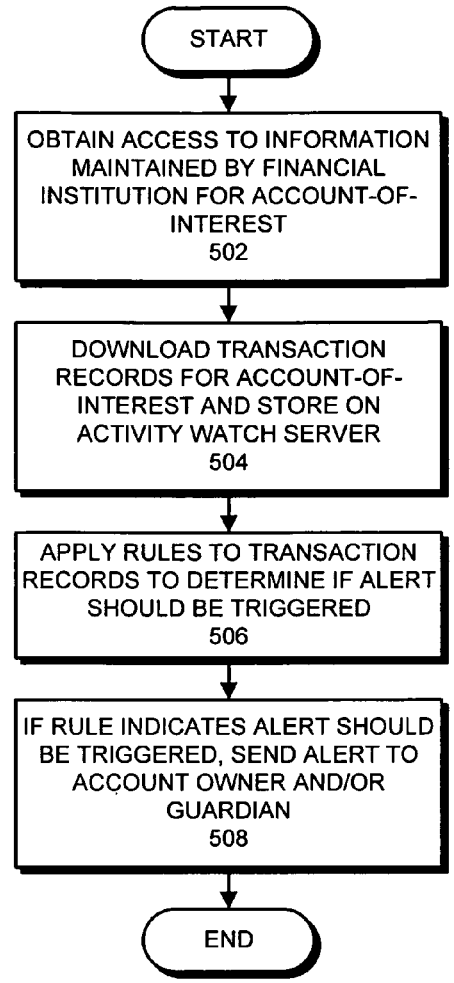
FIG. 5 presents a flow chart illustrating how the third-party server monitors an account and sends alerts in accordance with an embodiment of the present invention.

FIG. 5 presents a flow chart illustrating how third-party server 106 monitors an account in accordance with an embodiment of the present invention. First, the system obtains access to account information for one or more accounts-of-interest maintained by one or more financial institutions (step 502). For example, this can involve using a password from account owner profile 108 (which was previously supplied by account owner 104) to login to the account. Note that these accounts can include any type of account that can be accessed electronically, and for which it is possible to obtain itemized transaction information on a timely basis, preferably within a day or two. For example, these accounts can include bank accounts, credit card accounts, eBay™ accounts, and PayPal™ accounts. In addition to these types of accounts, an account owner can also provide information needed to do credit checks. (Note that this may require some negotiation with credit reporting agencies to ensure that that the account monitoring process does not affect the account owner's credit rating.)

Next, the system downloads transaction records for the accounts-of-interest and stores them in database 112 within third-party server 106 (step 504). Note that account owners can arrange to have their account data automatically uploaded to the third-party server on a regular basis, such as daily or weekly.

The system then applies rules to the transaction records to determine if an alert should be triggered (step 506). For example, these rules can be specified in the following form.
1. on a charge over $100 from a (new or distant) business trigger a low-level alert;
2. on a charge exceeding $300 from a known business trigger a low-level alert;
3. on an ATM withdrawal exceeding $100 trigger a medium-level alert;

4. on an ATM withdrawal exceeding $300 trigger a high-level alert; and
5. on total ATM withdrawals that exceed $400 during a 3-day period trigger a high-level alert.

The account owner or guardian can also specify how the alerts are to be sent. For example, sending the alerts can involve: sending an email to the account owner and/or guardian; sending a pager notification to the account owner and/or guardian; sending a recorded telephone message to the account owner and/or guardian; sending a facsimile to the account owner and/or guardian; or causing a human operator to contact the account owner and/or guardian.

Finally, if a rule indicates that an alert should be triggered, the system sends the alert (or an escalating series of alerts) to the account owner and/or guardian (step 508). Note that an escalating series of alerts can be delivered through different communication mechanisms, which are configurable by the account owner and/or guardian. For example, the alerts can be delivered in a progression as follows:

1. a low-level alert would trigger an email message;
2. a medium-level alert would trigger an email message and a single automated phone call (to each phone number assigned for this purpose); and
3. a high-level alert would trigger the medium alert response, plus a follow-up every four hours (phone calls during designated times, of course), and if no response is received within a day or so, a human phone call.

An account owner and/or guardian can respond by punching-in a secret code to acknowledge the alert, or can respond by visiting a webpage to acknowledge an alert. (Obviously, accepting acknowledgements via email would be somewhat insecure using current Internet email systems).

One embodiment of the present invention also assists the account owner and/or guardian in dealing with identity theft problems when they arise: by facilitating contact with credit card companies, banks, credit reporting agencies, the police and/or the Department of Motor Vehicles (DMV).

One embodiment of the present invention maintains statistics on the rules specified by account owners and/or guardians, a well as various statistics about the account owners, such as the account owners' residence location, age, gender, income level and transaction history. These statistics can be incorporated into a more sophisticated model incorporating some type of "expert system" technology, such as neural networks, Bayesian filters or other adaptive techniques, to enable the system to better recognize identity theft. Note that these techniques can also facilitate other types of services, such as tax-related assistance.

The present invention can also be applied to provide balance protection (for example, through automatic transfers without the steep bank fees) or more sophisticated financial analyses ("you would save $100/month by refinancing", etc.) to help account owners and/or guardians avoid looming problems.

In one embodiment of the present invention, the account information retrieved by the third-party server can be used for purposes in addition to triggering alerts, such as backup and recovery of the data or remote access to the data.

In one embodiment of the present invention, the system uses feedback about whether alerts are false-positive alerts, true-positive alerts, false-negative alerts or true-negative alerts, to update the one or more rules that determine whether an alert should be triggered. Note that true-negative alerts (fraudulent transactions that went undetected) may have to be determined manually after an identity theft has been reported.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer executed method for facilitating a guardian to monitor a financial account on behalf of an account owner, comprising:
   receiving, at a computer, a request from the guardian to access the financial account, wherein the financial account belongs to the account owner, and wherein the guardian is a person monitoring the financial account on behalf of the account owner;
   determining whether the guardian is authorized to access the financial account; and
   based on the determination, producing a result which can be executed by a computer to provide the guardian with read-only access to the financial account, whereby the guardian can monitor activity in the financial account, but is not allowed to perform operations that modify the financial account, and wherein the guardian can restrict activity on the financial account;
   thereby facilitating the guardian to monitor the financial account on behalf of the account owner.

2. The method of claim 1, wherein the method further comprises:
   receiving a request from the guardian to restrict an activity on the financial account; and
   in response to the request, determining if the guardian is authorized to restrict the activity, and if so, restricting the activity.

3. The method of claim 2, wherein restricting the activity on the financial account involves putting a freeze on transactions for the financial account.

4. The method of claim 1,
   wherein the request to access the financial account is received at a third-party server, which is independent from a financial institution that maintains the financial account;
   wherein the third-party server determines whether the guardian is authorized to access the financial account; and
   wherein the third-party server facilitates read-only access to the financial account.

5. The method of claim 1, wherein the method further comprises:
   receiving transactions associated with the financial account;
   applying one or more rules to the transactions to determine whether the guardian should be alerted; and
   if a rule indicates that the guardian should be alerted, sending an alert to the guardian.

6. The method of claim 5, wherein sending the alert to the guardian involves:
   sending an email to the guardian;
   sending a pager notification to the guardian;
   sending a recorded telephone message to the guardian;
   sending a facsimile to the guardian; or
   causing a human operator to contact the guardian.

7. The method of claim 5, wherein sending the alert to the guardian involves sending an escalating series of alerts to the guardian if the guardian does not respond to any of the alerts.

8. The method of claim 5, wherein after sending the alert, the method further comprises allowing the guardian to obtain details about the one or more transactions that triggered the alert.

9. The method of claim 5, wherein the method further comprises allowing the guardian to specify and/or modify the one or more rules that determine whether an alert should be triggered.

10. The method of claim 5, wherein receiving the transactions involves receiving transactions for multiple financial accounts belonging to the account owner, wherein the multiple financial accounts are associated with multiple financial institutions.

11. The method of claim 5, wherein receiving the transactions involves:
   obtaining account-access information from the account owner; and
   using the account-access information to obtain the transactions associated with the financial account from the financial institution.

12. The method of claim 1, wherein the financial account can include, but is not limited to:
   a bank account;
   a credit-card account;
   a credit report; or
   an investment account.

13. A computer-readable storage medium storing instructions that when executed by a computer cause the computer to perform a method for facilitating a guardian to monitor a financial account on behalf of an account owner, the method comprising:
   receiving a request from the guardian to access the financial account, wherein the financial account belongs to the account owner, and wherein the guardian is a person monitoring the financial account on behalf of the account owner;
   determining whether the guardian is authorized to access the financial account; and
   based on the determination, producing a result which can be executed by a computer to provide the guardian with read-only access to the financial account, whereby the guardian can monitor activity in the financial account, but is not allowed perform operations that modify the financial account, and wherein the guardian can restrict activity on the financial account;
   thereby facilitating the guardian to monitor the financial account on behalf of the account owner.

14. The computer-readable storage medium of claim 13, wherein the method further comprises:
   receiving a request from the guardian to restrict and activity on the financial account; and
   in response to the request, determining if the guardian is authorized to restrict the activity, and if so, restricting the activity.

15. The computer-readable storage medium of claim 14, wherein restricting the activity on the financial account involves putting a freeze on transactions for the financial account.

16. The computer-readable storage medium of claim 13,
   wherein the request to access the financial account is received at a third-party server, which is independent from a financial institution that maintains the financial account;
   wherein the third-party server determines whether the guardian is authorized to access the financial account; and
   wherein the third-party server facilitates read-only access to the financial account.

17. The computer-readable storage medium of claim 13, wherein the method further comprises:
   receiving transactions associated with the financial account;
   applying one or more rules to the transactions to determine whether the guardian should be alerted; and
   if a rule indicates that the guardian should be alerted, sending an alert to the guardian.

18. The computer-readable storage medium of claim 17, wherein sending the alert to the guardian involves:
   sending an email to the guardian;
   sending a pager notification to the guardian;
   sending a recorded telephone message to the guardian;
   sending a facsimile to the guardian; or
   causing a human operator to contact the guardian.

19. The computer-readable storage medium of claim 17, wherein sending the alert to the guardian involves sending an escalating series of alerts to the guardian if the guardian does not respond to any of the alerts.

20. The computer-readable storage medium of claim 17, wherein after sending the alert, the method further comprises allowing the guardian to obtain details about the one or more transactions that triggered the alert.

21. The computer-readable storage medium of claim 17, wherein the method further comprises allowing the guardian to specify and/or modify the one or more rules that determine whether an alert should be triggered.

22. The computer-readable storage medium of claim 17, wherein receiving the transactions involves receiving transactions for multiple financial accounts belonging to the account owner, wherein the multiple financial accounts are associated with multiple financial institutions.

23. The computer-readable storage medium of claim 17, wherein receiving the transactions involves:
   obtaining account-access information from the account owner; and
   using the account-access information to obtain the transactions associated with the financial account from the financial institution.

24. The computer-readable storage medium of claim 17, wherein the financial account can include, but is not limited to:
   a bank account;
   a credit-card account;
   a credit report; or
   an investment account.

25. A computer-based system that facilitates a guardian to monitor a financial account on behalf of an account owner, comprising:
   a computer system, including a processor and a memory;
   an interface within the computer system configured to receive a request from the guardian to access the financial account, wherein the financial account belongs to the account owner, and wherein the guardian is a person monitoring the financial account on behalf of the account owner;
   an authorization module within the computer system configured to determine whether the guardian is authorized to access the financial account; and
   an access module within the computer system, wherein if the guardian is authorized to access the financial account, the access module is configured to produce a result which can be executed by a computer to provide the guardian with read-only access to the financial account, whereby the guardian can monitor activity in the financial account, but is not allowed to perform operations that modify the financial account, and wherein the guardian can restrict activity on the financial account;

thereby facilitating the guardian to monitor the financial account on behalf of the account owner.

26. The computer-based system of claim 25,
wherein the interface is additionally configured to receive a request from the guardian to restrict activity on the financial account; and
wherein if the guardian is authorized to restrict activity on the financial account, the access module is configured to restrict activity on the financial account.

27. The computer-based system of claim 25, wherein the computer system is a third-party server, which is independent from a financial institution that maintains the financial account.

28. The computer-based system of claim 25, further comprising an alert-triggering module within the computer system, which is configured to:
  receive transactions associated with the financial account;
  apply one or more rules to the transaction to determine whether the guardian should be alerted; and
  if a rule indicates that the guardian should be alerted, to send the alert to the guardian.

* * * * *